(12) United States Patent
Tame

(10) Patent No.: US 6,520,584 B1
(45) Date of Patent: Feb. 18, 2003

(54) ADJUSTMENT MECHANISM FOR AN AUTOMOTIVE SEAT

(75) Inventor: Omar D. Tame, West Bloomfield, MI (US)

(73) Assignee: Magna Seating Systems Inc., Aurora (CA)

( * ) Notice: Subject to any disclaimer, the term of this patent is extended or adjusted under 35 U.S.C. 154(b) by 0 days.

(21) Appl. No.: 09/807,306

(22) PCT Filed: Oct. 3, 1999

(86) PCT No.: PCT/CA99/00962

§ 371 (c)(1), (2), (4) Date: Apr. 11, 2001

(87) PCT Pub. No.: WO00/21780

PCT Pub. Date: Apr. 20, 2000

Related U.S. Application Data

(60) Provisional application No. 60/104,067, filed on Oct. 3, 1998.

(51) Int. Cl.[7] .................................................. B60N 2/02
(52) U.S. Cl. .................. 297/374; 297/362.12; 297/369; 192/223.1
(58) Field of Search ........................... 297/374, 362.12, 297/354.1, 354.11; 192/223.4

(56) References Cited

U.S. PATENT DOCUMENTS

| | | | |
|---|---|---|---|
| 3,285,657 A | 11/1966 | Gaston | |
| 3,501,198 A | 3/1970 | Boyce | |
| 3,517,965 A | 6/1970 | Cowels et al. | |
| 3,602,547 A | 8/1971 | Tabor | |
| 4,062,587 A | 12/1977 | Wolters | |
| 4,408,799 A | * 10/1983 | Bowman | 16/242 |
| 4,425,987 A | 1/1984 | Porter | |
| 4,533,027 A | * 8/1985 | Otani et al. | 188/166 |
| 4,573,738 A | 3/1986 | Heesch | |
| 4,600,240 A | 7/1986 | Suman et al. | |
| 4,634,182 A | 1/1987 | Tanaka | |
| 4,687,252 A | 8/1987 | Bell et al. | |
| 4,696,515 A | 9/1987 | Heesch | |
| 4,705,319 A | * 11/1987 | Bell | 297/362 |
| 4,781,415 A | 11/1988 | Heesch et al. | |
| 5,163,736 A | 11/1992 | Aljundi | |
| 5,833,317 A | 11/1998 | Massara et al. | |
| 5,842,659 A | * 12/1998 | Ligon et al. | 192/17 D |
| 6,279,995 B1 | * 8/2001 | Nakamura et al. | 297/362.12 |
| 6,375,263 B1 | * 4/2002 | Elio et al. | 297/354.12 |

FOREIGN PATENT DOCUMENTS

| | | |
|---|---|---|
| DE | A 47 C 1/025 | 1/1987 |
| EP | 0 225 228 B1 | 10/1986 |

* cited by examiner

Primary Examiner—Anthony D. Barfield
Assistant Examiner—Erika Garrett
(74) Attorney, Agent, or Firm—Clark Hill PLC

(57) ABSTRACT

A mechanism (16) adjusts a relative position of a component (14) within the vehicle. The mechanism has a mounting bracket (18). A drive drum (20) is mounted rotatably on the bracket for providing a rotary output to adjust the component (14). An actuation handle (22) is rotatably mounted to the drive drum (20) and rotatable relative to the drive drum (20) from a neutral position. A coil spring (24) surrounds the drive drum (20) in a sliding engagement. A return spring assembly (54) engages the coil spring (24). The handle (22) engages the coil spring (24) and the return spring assembly (54). As the handle (22) is rotated from the neutral position, the coil spring (24) is rotated in a winding sense about the drive drum (20) and against the return spring (54) thereby coupling the handle (22) and the drive drum (20) for rotation. As the handle (22) is counter rotated towards the neutral position, the return spring assembly (54) urges the coil spring (24) to rotate in an unwinding sense, uncoupling the handle (22) from the drive drum (20).

8 Claims, 3 Drawing Sheets

ADJUSTMENT MECHANISM FOR AN AUTOMOTIVE SEAT

This application claims the benefit of provisional application No. 60/104,067, filed Oct. 3, 1998.

FIELD OF INVENTION

The subject Invention relates to an adjustment mechanism for adjusting various components of a vehicle, particularly a seat.

DESCRIPTION OF THE PRIOR ART

Adjustment mechanisms are widely used in automotive vehicles for adjusting a variety of components such as window panes, headrests, armrests, seat backs and seat cushions. Many prior art adjustment mechanisms incorporate complicated ratchet and pawl mechanisms and/or gear arrangements. Examples of such adjustment mechanisms are shown in U.S. Pat. Nos. 4,634,182, 4,696,515 and 4,705,319. These adjustment mechanisms utilize a large number of moving parts which adds to the overall cost and weight of the vehicle. In addition, the adjustment mechanisms have a higher propensity for failure and need for replacement of parts.

The prior art has also contemplated the use of coil springs within the adjustment mechanisms to move between a release position and a locking position. The coil springs use frictional forces to secure the component being adjusted. An example of such a coil spring adjustment mechanism for a seat cushion is shown in U.S. Pat. No. 4,533,027. The '027 patent has a coil spring coupling an input shaft to an output shaft. The input shaft is directly connected to an actuation handle. The range of rotation for the output shaft is directly proportional to the range of rotation for the actuation handle. Accordingly, when the seat cushion is being adjusted, the handle remains is an actuated position. An example of a coil spring adjustment mechanism for a seat back recliner is shown in U.S. Pat. No. 5,163,736. The '736 patent utilizes the coil spring to hold the recliner in a desired position. The recliner incorporates additional parts to provide the adjustment and the user must push the seat back to recline the seat back rearward.

The prior art coil spring adjustment mechanisms require additional parts, require that the user assists in the adjustment, and/or have a limited range of motion. Accordingly, it is desirable to have an adjustment mechanism which utilizes a coil spring for providing an unlimited range of adjustment and does not require any additional parts or a user to initiate the adjustment. In addition, the adjustment mechanism should be capable of adjusting in both a rotational and a counter rotational direction.

SUMMARY OF THE INVENTION

A mechanism adjusts a relative position of a component within the vehicle. The mechanism has a mounting bracket. A drive drum is mounted rotatably on the bracket for providing a rotary output to adjust the component. An actuation handle is rotatably mounted to the drive drum and rotatable relative to the drive drum from a neutral position. A coil spring surrounds the drive drum in a sliding engagement. A return spring assembly engages the coil spring. The handle engages the coil spring and the return spring assembly. As the handle is rotated from the neutral position, the coil spring is rotated in a winding sense about the drive drum and against the return spring thereby coupling the handle and the drive drum for rotation. As the handle is counter rotated towards the neutral position, the return spring assembly urges the coil spring to rotate in an unwinding sense, uncoupling the handle from the drive drum.

Accordingly, the subject invention utilizes a coil spring and provides for an unlimited range of adjustment in either rotational direction. The subject adjustment assembly does not require any additional parts or a user to initiate the adjustment. The adjustment assembly operates to ratchet the component being adjusted. In other words, the adjustment assembly grasps the component, moves the component and then releases the component and returns to the original position such that the adjustment assembly may grasp the component again if desired. This "ratcheting" operation may continue until the component is moved into a desired position.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
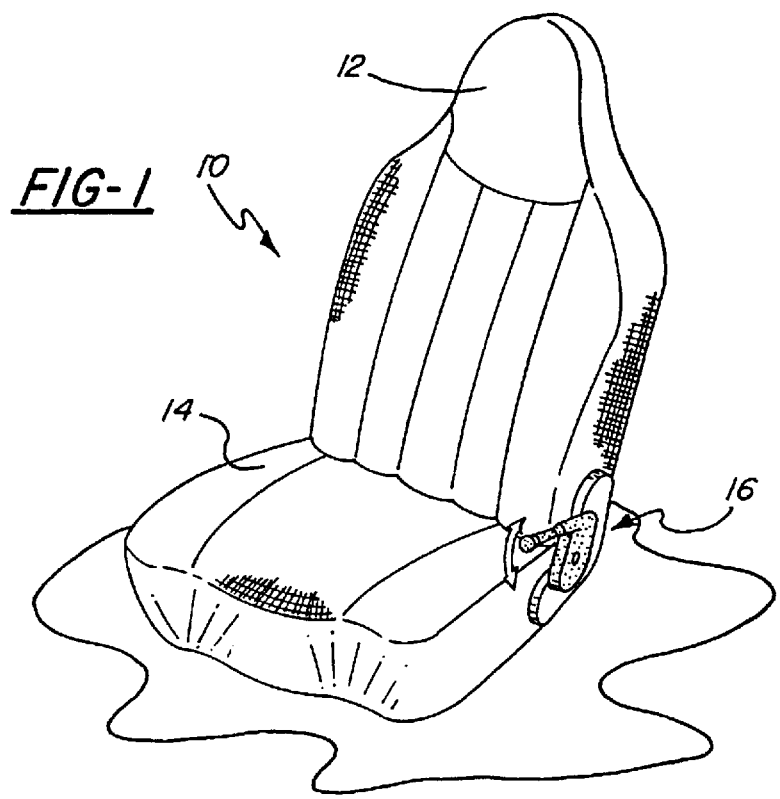
FIG. 1 is a perspective view of an automotive seat incorporating an adjustment assembly in accordance with the subject invention.
Figure 2:
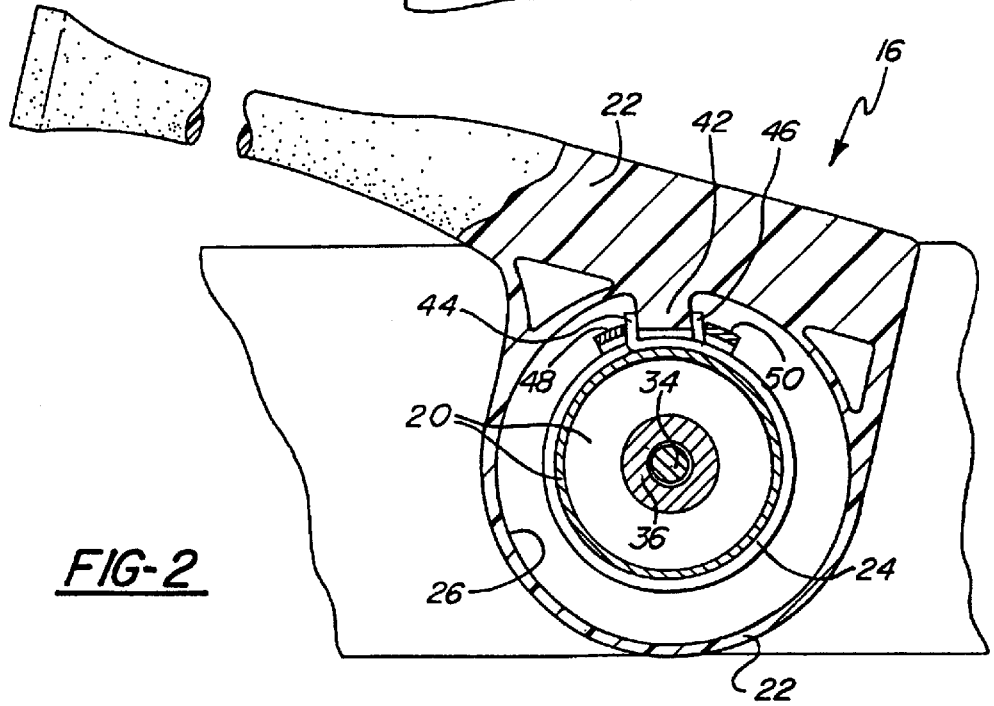
FIG. 2 is a partially cross-sectional side view of the adjustment assembly.

Referring to the Figures, wherein like numerals indicate like or corresponding parts throughout the several views, an automotive seat is generally shown at 10 in FIG. 1. The seat 10 includes a seat cushion 12 and a seat back 14 pivotally mounted to the seat cushion 12. The seat cushion 12 and seat back 14 may be of any suitable design or configuration and may be mounted within any type of vehicle.

The seat cushion 12 of the subject invention includes an adjustment assembly, generally shown at 16. The adjustment assembly 16 may adjust a relative position of any component within the vehicle. For illustrative purposes, the adjustment assembly 16 is incorporated into the seat 10 for providing selective adjustment to the seat cushion 12. As is appreciated by those skilled in the art, the adjustment assembly 16 of the subject invention may be incorporated into any number of different components such as the seat back 14, a headrest, an armrest or a vehicle door. The adjustment assembly 16 may be utilized to adjust the forward and rearward position of the seat 10, the reclining position of the seat back 14, the position of a lumbar support, the relative position of the headrest or armrest, the upward and downward movement of a window pane, or the like. In other words, the adjustment assembly 16 of the subject invention is in no way limited to the particular environment shown in the Figures and discussed hereinbelow.

As shown, the adjustment assembly 16 is mounted within the seat cushion 12 by any suitable means and manipulates the position of the seat cushion 12. The seat cushion 12 may be moved upward, downward, or tilted.

Referring to FIGS. 2 through 6, the adjustment assembly 16 is shown in greater detail. The adjustment assembly 16 comprises a mounting bracket 18 adapted to be mounted to a frame (not shown) of the seat cushion 12. A drive drum 20 is mounted rotatably to the bracket 18. An actuation handle 22 is commonly mounted to the drive drum 20 for relative rotatable movement thereto. A coil spring 24 surrounds the drive drum 20 and selectively couples the handle 22 to the drive drum 20. The handle 22, drive drum 20 and coil spring 24 are all supported by the mounting bracket 18.

The handle 22 is generally club shaped and has a cavity 26 (shown in FIG. 2) in the head portion of the club. The drive drum 20 and the coil spring 24 are rotatably disposed within the cavity 26. A tab 42 projects inwardly into the cavity 26. Cavity 26 has an aperture 30 at the centre.

Figure 3:
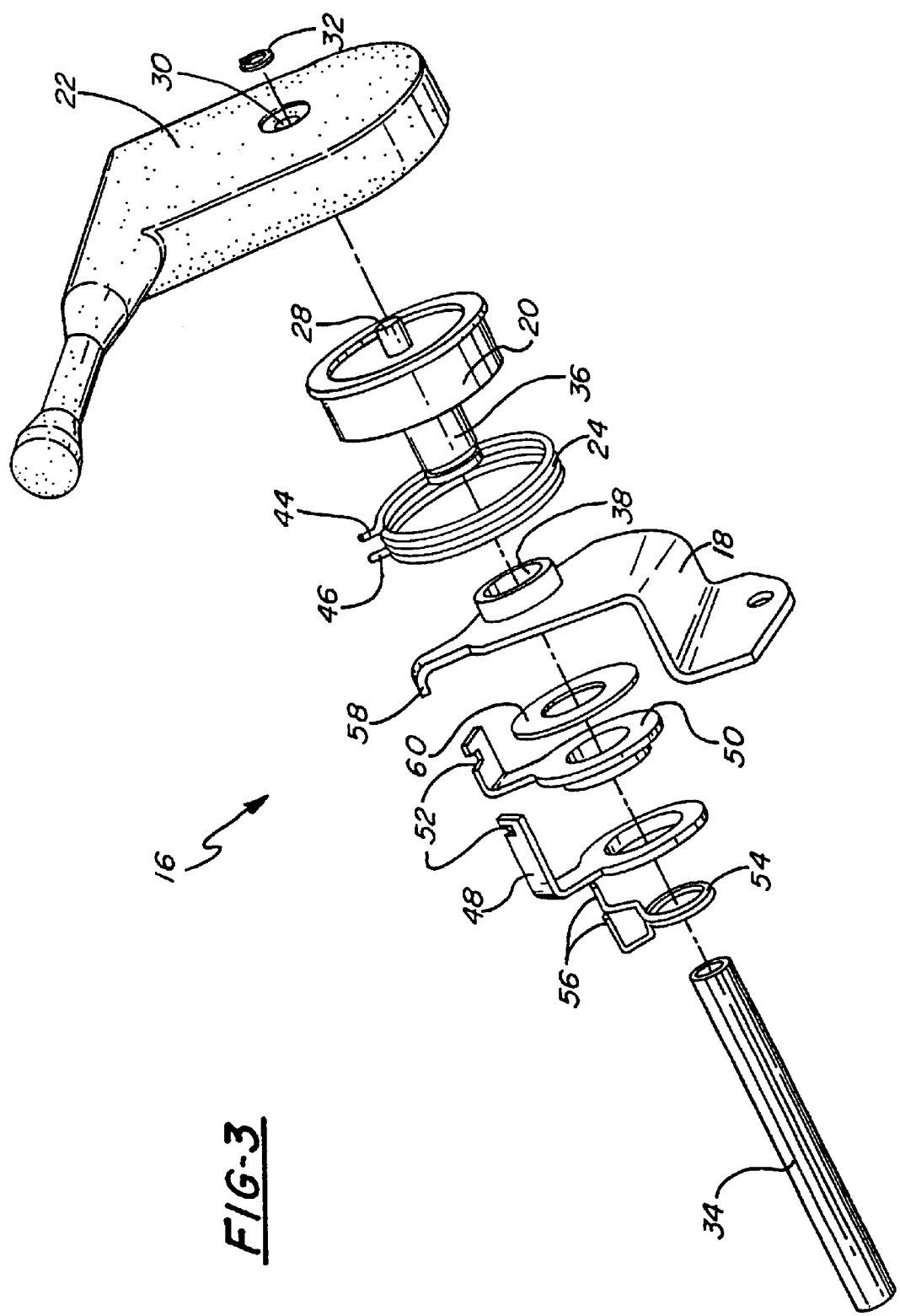
FIG. 3 is an exploded view of the adjustment assembly.

As shown in FIG. 3, the drive drum 20 includes an outwardly extending pin 28 which projects through aperture 30 to rotatably connect the drive drum 20 to the handle 22. A locking ring 32 or the like snaps around the pin 28 to secure the drive drum 20 to the handle 22.

The drive drum 20 has a coaxial hub 36 having an axial bore which drivingly receives shaft 34. The output shaft 34 preferably has an irregular shape such as hexagonal for a driving engagement with the drive drum 20. The output shaft 34 is connected to a plurality of gears (not shown) for transferring the rotary output to operative mechanisms of the seat cushion 12. Specifically, a sprocket meshes with a rack gear disposed within a gear housing 40 which in turn moves the seat cushion 12 as desired. The particular type of gearing arrangement would depend upon the application of the adjustment assembly 16 and the component being adjusted.

The hub 36 extends through opening 38 in the mounting bracket 18. Opening 38 has a collar presenting a bearing surface for journal mounting drive drum 20 to the mounting bracket 18.

The coil spring 24 has a plurality of turns with a first end 44 and a second 46 end which over lap. The diameter of the turns is slightly less than the diameter of the outer friction surface of drive drum 20. The ends 44, 46 of the spring 24 are urged together, which expands the turns, in order to apply the coil spring 24 onto the drive drum 20. Upon release of the ends 44, 46, the spring 24 contracts to frictionally engage the drive drum 20. Preferably, the spring 24 will have only a slight engaging bias in a neutral position which allows relative frictional movement of the spring 24 relative to the drive drum 20. Once assembled, tab 42 is positioned between ends 44, 46 to engage therewith on rotation or counter rotation of the handle 22 from a neutral position.

The adjustment assembly 16 further includes a return spring assembly comprising return arms 48, 50 and a return spring 54. Arms 48, 50 are rotatably mounted on hub 36. Each return arm is L-shaped and extends radially and then axially. The distal end of each return arm 48, 50 has a notch 52 for receiving ends 44, 46 of the coil spring 24. Return spring 54 is coaxially mounted on the hub 36 and continuously biases the first return arm 48 and second return arm 50 towards each other. Specifically, the return spring 54 has a pair of armatures 56 engaging each of the first aim 48 and second arm 50. First return arm 48 and second return arm 50 extend on opposite sides of stop 58. Thus, as return arm 48 is rotated away from the stop 58, return arm 50 will be prevented from rotating and the return spring 54 will urge the return arm 48 to return to engage the stop 58. When the return arm 50 is counter rotated, return arm 48 will be prevented from rotating and the spring 54 will urge the return arm 50 to return to engage the stop 58.

Figure 4:
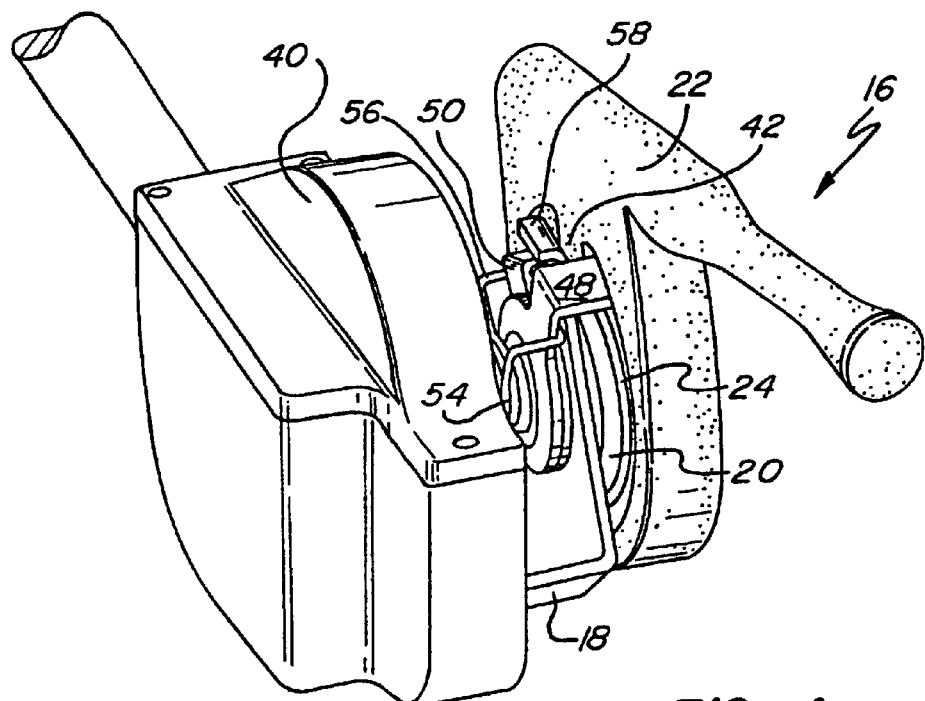
FIG. 4 is a perspective view of the adjustment assembly mounted to a gear housing.
Figure 5:
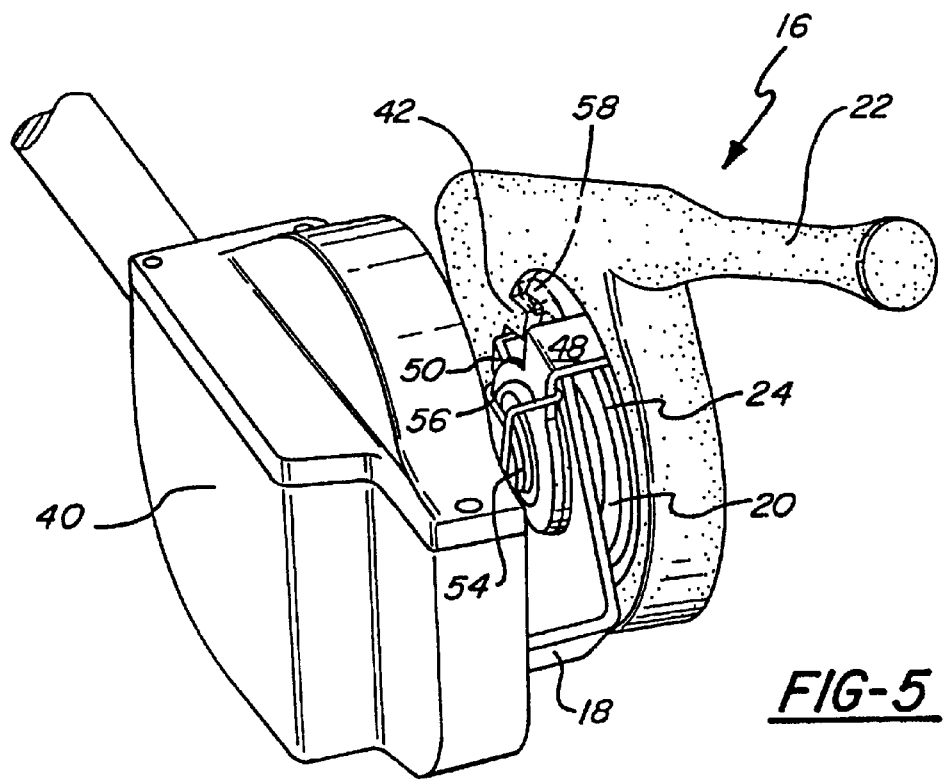
FIG. 5 is a perspective view of the adjustment assembly of FIG. 4 in an actuated position.

As best shown in FIGS. 4 and 5, the first return arm 48 and second return arm 50 extend into the cavity 26 of the handle 22. The tab 42 is positioned between the first return 48 and second return 50 and the ends 44, 46 of the coil spring 24.

During operation, the handle 22 may be actuated in either a rotational or counter rotational direction, i.e., upwardly as shown in FIG. 5 (clockwise as viewed from the outside of the handle 22) or downwardly (counter-clockwise as viewed from the outside of the handle 22), from a non-actuated or neutral position. During upward movement of the handle 22, the output shaft 34 will be rotated in a first sense, which, for example, may actuate the seat cushion 12 upward. As appreciated, the actual actuation of the seat cushion 12 will occur through the gearing. During downward movement of the handle 22, the output shaft 34 will be rotated in an opposite sense, which may actuate the seat cushion 12 downward.

As the handle 22 is rotated in a counter clockwise sense, the tab 42 within the handle 22 engages the first return arm 48 and the first end 44 of the coil spring 24. The counter clockwise engagement of the first end 44 of the coil spring 24 will wind or tighten the spring 24 around the drive drum 20. Specifically, the first end 44 of the coil spring 24 will be rotationally pulled which in turn will rotationally wind the coils of the spring 24 to a point until the frictional forces lock the coil spring 24 to the drive drum 20. The winding or tightening of the coil spring 24 around the drive drum 20 will be strong enough to couple the handle 22 to the drive drum 20 along with the output shaft 34 to actuate the seat cushion 12. Hence, the handle 22, drive drum 20, and coil spring 24 are rotating clockwise as a single unit. The first return arm 48 will also move clockwise with the handle 22 against the biasing force of the return spring 54.

At some point the rotational movement in the first sense of the handle 22 will be stopped. This may occur when either the desired position of the seat cushion 12 has been obtained or a predetermined maximum rotational movement of the handle 22 has been reached. The handle 22 will now be released and the return spring 54 will urge the handle 22 to the non-actuated or neutral position. The return spring 54 will bias the first return arm 48 clockwise toward the stop 58 of the mounting bracket 18. The clockwise movement of the first return arm 48 pushes against the first end 44 of the coil spring 24 in an unwinding sense. The clockwise movement of the first distal end 44 of the coil spring 24 unwinds the spring 24 to decouple the movement of the handle 22 from the drive drum 20, allowing the spring 24 to rotate relative to the cylindrical drive drum 20. In other words, the coils of the coil spring 24 open sufficiently such that the frictional forces between the coil spring 24 and the drive drum 20 are minimized.

The first return arm 48 acts against the tab 42 of the handle 22 in the clockwise direction to rotate the handle 22 about the drive drum 20 into the original neutral position. The clockwise biasing of the first return arm 48 continues until the first return arm 48 abuts the stop 58 of the mounting bracket 18. The adjustment assembly 16 is now returned to the non-actuated or neutral position and the output shaft 34 remains rotated counter-clockwise the desired amount. Hence the seat cushion 12 remains in the adjusted position while the handle 22 returns to the non-actuated position.

If further movement of the seat cushion 12 is desired, then the rotational operation of the handle 22 as stated above can be repeated until the maximum upward position of the seat cushion 12 is obtained. Accordingly, the adjustment mechanism of the present invention operates in a ratcheting type fashion.

If clockwise rotation of the output shaft 34 is desired, then the handle 22 can be rotated in the counter sense and a similar operation of the adjustment assembly 16 will occur. In the example as stated, clockwise rotation will actuate the seat cushion 12 downward, i.e., opposite from above. During counter rotational movement of the handle 22, the tab 42 within the handle 22 engages the second return arm 50 and the second end 46 of the coil spring 24. The clockwise engagement of the second end 46 of the spring 24 will tighten the spring 24 around the drive drum 20. Specifically, the second end 46 of the coil spring 24 will be rotationally pulled which in turn will rotationally pull the coils of the spring 24 to a point until the frictional forces lock the coil spring 24 to the drive drum 20. The tightening of the coil spring 24 around the drive drum 20 will be strong enough to couple the drive drum 20 to the shaft 34 to actuate the movement of the seat cushion 12. Hence, the handle 22, drive drum 20, and coil spring 24 are rotating counter-clockwise as a single unit. The second return arm 50 will also move clockwise with the handle 22 against the biasing force of the return spring 54.

At some point the upward movement of the handle 22 will be stopped. As discussed above, this may occur when either the desired position of the seat cushion 12 has been obtained or the predetermined maximum rotational movement of the handle 22 has been reached. The handle 22 will now be released and the return spring 54 will automatically return the handle 22 to the non-actuated or neutral position. More specifically, the return spring 54 will bias the second return arm 50 counter-clockwise toward the stop 58 of the mounting bracket 18. The counter-clockwise movement of the second return arm 50 pushes against the second end 46 of the coil spring 24. The counter-clockwise movement of the second end 46 of the coil spring 24 unwinds the spring 24 and allows the spring 24 to uncouple from the drive drum 20. In other words, the coils of the coil spring 24 open sufficiently such that the frictional forces between the coil spring 24 and the drive drum 20 are minimized.

The second return arm 50 also pushes against the tab 42 of the handle 22 in the counter-clockwise direction to rotate the handle 22 about the drive drum 20 to the non-actuated or neutral position. The counter-clockwise biasing of the second return arm 50 urges the second return arm 50 into abutment with the stop 58 of the mounting bracket 18. The adjustment assembly 16 is now returned to the non-actuated position and the shaft 34 remains rotated clockwise the desired amount.

If further movement of the seat cushion 12 is desired, then the upward operation of the handle 22 as stated above can be repeated until the maximum position of the seat cushion 12 is obtained. As appreciated, the upward and downward movement of the seat cushion 12 is discussed as only an example of the operation of adjustment assembly 16. The adjustment assembly 16 could actuate any type of component in any type of seating arrangement.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that within the scope of the appended claims the invention may be practiced otherwise than as specifically described.

What is claimed is:

1. A mechanism for adjusting a relative position of a component of a vehicle, said mechanism comprising:

a mounting bracket;

a drive drum mounted rotatably on said bracket for providing a rotary output to adjust the component;

an actuation handle rotatably mounted to said drive drum and rotatable relative to said drive drum from a neutral position;

a coil spring surrounding said drive drum in a sliding engagement, said coil spring having a plurality of turns terminating in first and second ends which overlap and said handle engages one of said ends as said handle is rotated in either a first sense or an opposite second sense from the neutral position and wherein said turns of said coil spring frictionally clamp around said drive drum when said coil spring is rotated in a winding sense; and a return spring assembly engaging said coil spring, said return spring assembly comprising two return arms rotatably mounted coaxially with said drive drum, a spring biasing said return arms towards each other and a stop separating said return arms and preventing rotation of one of said return arms when the other is rotated away from the other return arm, one of said return arms engaging said first end of said coil spring and the other of said return arms engaging said second end of said coil spring;

said handle engaging said coil spring and said return spring assembly whereby as said handle is rotated from the neutral position said coil spring is rotated in a winding sense about said drive drum and against said return spring, coupling said handle and said drive drum for rotation, and as said handle is counter rotated towards the neutral position, said return spring assembly urges said coil spring to rotate in an unwinding sense, uncoupling said handle from said drive drum.

2. An assembly as set forth in claim 1 wherein said handle includes an integral cavity with a tab projecting into said cavity and at least a portion of said drive drum and said coil spring being disposed within said cavity and said tab is positioned between said first and second ends of said coil spring.

3. An assembly as set forth in claim 2 wherein said drive drum includes an outwardly extending pin and said handle is rotatably mounted on said pin.

4. An assembly as set forth in claim 2 wherein said drive drum has a hub which rotatably engages said mounting bracket.

5. An assembly as set forth in claim 4 wherein said return spring assembly is rotatably mounted on said hub.

6. An assembly as set forth in claim 5 further including an output shaft and said drive drum is drivingly mounted thereon for transferring said rotary output of said drive drum to the component.

7. An assembly as set forth in claim 2 wherein each of said return arms has a notch for receiving one of said first and second ends of said coil spring.

8. An assembly as set forth in claim 2 wherein said stop extends from said bracket.

* * * * *

UNITED STATES PATENT AND TRADEMARK OFFICE
CERTIFICATE OF CORRECTION

PATENT NO. : 6,520,584 B1
DATED : February 18, 2003
INVENTOR(S) : Omar D. Tame

It is certified that error appears in the above-identified patent and that said Letters Patent is hereby corrected as shown below:

Column 3,
Line 59, "aim" should be -- arm --.

Column 6,
Line 55, "5" should be -- 2 --.

Signed and Sealed this

Twenty-second Day of July, 2003

JAMES E. ROGAN
*Director of the United States Patent and Trademark Office*